US007827495B2

(12) United States Patent
Bells et al.

(10) Patent No.: US 7,827,495 B2
(45) Date of Patent: Nov. 2, 2010

(54) METHOD AND DATA STRUCTURE FOR USER INTERFACE CUSTOMIZATION

(75) Inventors: Matthew Bells, Waterloo (CA); Gerhard Dietrich Klassen, Waterloo (CA); Kenneth Wallis, Oakville (CA); Scotte Zinn, Waterloo (CA)

(73) Assignee: Research In Motion Limited, Waterloo (CA)

( * ) Notice: Subject to any disclaimer, the term of this patent is extended or adjusted under 35 U.S.C. 154(b) by 621 days.

(21) Appl. No.: 10/930,822

(22) Filed: Sep. 1, 2004

(65) Prior Publication Data

US 2005/0050474 A1 Mar. 3, 2005

Related U.S. Application Data

(60) Provisional application No. 60/499,437, filed on Sep. 2, 2003.

(51) Int. Cl.
*G06F 3/00* (2006.01)

(52) U.S. Cl. .................. 715/744; 715/746; 715/747; 715/748; 715/815

(58) Field of Classification Search .................. 715/744, 715/746, 747, 748, 815
See application file for complete search history.

(56) References Cited

U.S. PATENT DOCUMENTS 5,122,784 A * 6/1992 Canova ...................... 345/605

| 5,895,476 | A  | * | 4/1999  | Orr et al. ...................... 715/202 |
| 6,449,639 | B1 | * | 9/2002  | Blumberg .................... 709/217 |
| 6,873,337 | B1 | * | 3/2005  | Fernandez et al. .......... 345/581 |
| 6,930,673 | B2 | * | 8/2005  | Kaye et al. .................. 345/173 |
| 2001/0048448 | A1 | * | 12/2001 | Raiz et al. .................... 345/700 |
| 2002/0039101 | A1 | * | 4/2002  | Fernandez et al. .......... 345/581 |
| 2002/0073104 | A1 | * | 6/2002  | Nunez ........................ 707/200 |
| 2002/0101444 | A1 |   | 8/2002  | Novak et al. |
| 2003/0018694 | A1 |   | 1/2003  | Chen et al. |
| 2003/0120593 | A1 |   | 6/2003  | Bansal et al. |
| 2003/0146934 | A1 |   | 8/2003  | Bailey et al. |

FOREIGN PATENT DOCUMENTS

| WO | WO 01/67286 | 9/2001 |
| WO | WO0167286 | 9/2001 |
| WO | 01/82065 | 11/2001 |
| WO | WO0182065 | 11/2001 |
| WO | 03/017077 | 2/2003 |
| WO | WO03017077 | 2/2003 |

OTHER PUBLICATIONS

Search Report dated Sep. 21, 2009.

* cited by examiner

*Primary Examiner*—Steven P Sax
*Assistant Examiner*—Andrey Belousov
(74) *Attorney, Agent, or Firm*—Ridout & Maybee LLP

(57) ABSTRACT

A method for changing visual attributes presented by a graphical user interface of a device such as a mobile electronic device by loading onto the device a file containing information for changing selected visual attributes of the interface. A method or compiler for generating or compiling a file that contains information used by a device to change the user interface presented by the device.

15 Claims, 10 Drawing Sheets

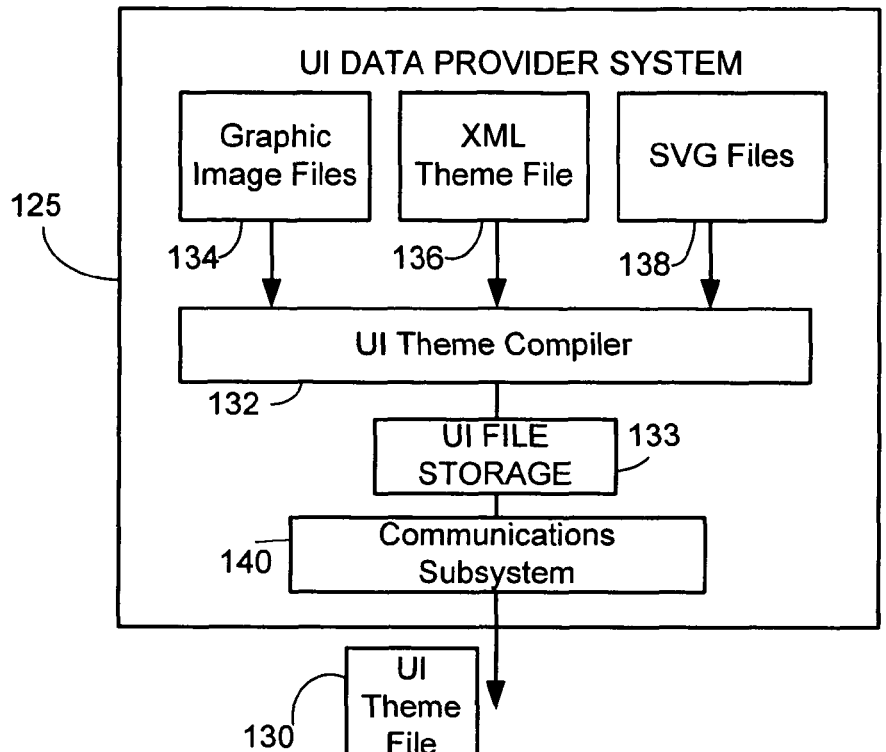
FIG. 3
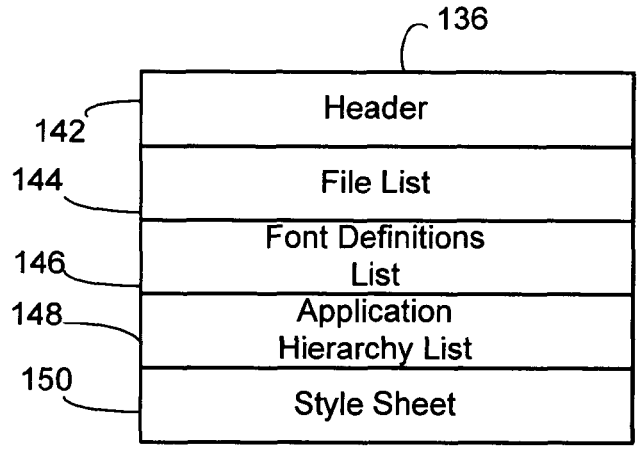
FIG. 4
```
<?xml version="1.0" encoding="UTF-8"?>
<theme xmlns:xsi="http://www.w3.org/2001/XMLSchema-instance"
xsi:noNamespaceSchemaLocation="..\..\Theme.xsd" name="CarrierA"      142
copyright="Research In Motion Ltd, 2003-2003" priority="carrier">
```
FIG. 5

```
<file-list>
    <!--system files-->
    <file name="content/dialog_hourglass.png"/>
    <file name="content/dialog_information.png"/>
    <file name="content/dialog_question.png"/>
    <file name="content/navigation_down_arrow.gif"/>
    <file name="content/navigation_left_arrow.png"/>
    <file name="content/navigation_right_arrow.png"/>
    <file name="content/navigation_up_arrow.gif"/>
    <file name="content/Folder-icons11x8.gif"/>
    <file name="content/Folder-icons14x10.gif"/>
         ⋮
    <!-- home screen files-->
    <file name="content/banner.pme"/>
    <file name="content/banner.png"/>
    <file name="content/Alarm_Indicator-icons17x7.png"/>
    <file name="content/Ribbon_BatteryLevel-icons28x12.png"/>
    <file name="content/Ribbon_SignalLevel-icons32x12.png"/>
    <file name="content/Ribbon_SignalLevel-icons32x11.png"/>
    <file name="content/Ribbon_UnreadCount-icons10x8.png"/>
    <file name="content/timefont.png"/>
    <file name="content/datefont.png"/>
         ⋮
    <!-- application icons -->
    <file name="content/icon_underlay~focus.png"/>
    <file name="content/messaging_app.Messages.png"/>
    <file name="content/messaging_app.Messages~focus.png"/>
    <file name="content/phone_app.png"/>
    <file name="content/phone_app~focus.png"/>
    <file name="content/addressbook_app.AddressBook.png"/>
    <file name="content/addressbook_app.AddressBook~focus.png"/>
    <file name="content/calendar_app.png"/>
    <file name="content/calendar_app~focus.png"/>
    <file name="content/task_app.png"/>
    <file name="content/task_app~focus.png"/>
    <file name="content/browser_daemon.browser.png"/>
    <file name="content/browser_daemon.browser~focus.png"/>
    <file name="content/PowerOff.png"/>
```

```
<file name="content/PowerOff~focus.png"/>                    144
<file name="content/Radio.off.png"/>
<file name="content/Radio.off~focus.png"/>
<file name="content/Radio.on.png"/>
<file name="content/Radio.on~focus.png"/>
            ⋮
<!-- application graphics -->
<file name="content/Message-icons10x8.png"/>
<file name="content/Message-icons10x10.png"/>
<file name="content/Message-icons12x12.png"/>
<file name="content/Message-icons14x14.png"/>
<file name="content/Message-icons18x18.png"/>
<file name="content/Phone-icons10x8.png"/>
<file name="content/Phone-icons10x10.png"/>
<file name="content/Phone-icons12x12.png"/>
<file name="content/Phone-icons14x14.png"/>
<file name="content/Phone-icons15x15.png"/>
<file name="content/Phone-icons18x18.png"/>
<file name="content/Phone_Volume-icons40x40.png"/>
<file name="content/Phone_Receiver-icons30x30.gif"/>
            ⋮
<!-- localization resources -->
<file name="resource/Theme.rrh"/>
<file name="resource/Theme.rrc"/>
<file name="resource/Theme_en.rrc"/>
</file-list>
```

FIG. 6

```
<bitmap-font name="CarrierADateFont" space-width="3" relative-
advance="1">
        <bitmap src="datefont.png"/>
        <widths first-char="!" >                                    146
//    !  "  #  $  %  amp  '  (  )  *  +  ,  -  .  /
      1, 0, 5, 0, 0, 4, 1, 2, 2, 3, 5, 1, 3, 1, 3,
//  0  1  2  3  4  5  6  7  8  9  :  ;  lt  =  gt  ?
    4, 3, 4, 4, 5, 4, 4, 5, 4, 4, 1, 1, 0, 0, 0, 0,
//  @  A  B  C  D  E  F  G  H  I  J  K  L  M  N  O
    0, 5, 4, 4, 4, 4, 3, 4, 4, 1, 3, 4, 4, 5, 4, 5,
//  P  Q  R  S  T  U  V  W  X  Y  Z
    4, 5, 4, 4, 5, 4, 5, 7, 5, 4, 4
   </widths>
  </bitmap-font>
```

```
<!--
    <application-icon>
        <padding top="1" right="0" bottom="1" left="0"/>
        <size width="48" height="49"/>                          148
    </application-icon>
-->
<application-hierarchy move="allow" hide="allow" default-folder="MyStuff">
    <folder move="deny" hide="deny">
        <application name="messaging_app.Messages" position="1"/>
        <application name="phone_app.Phone" position="2"/>
        <application name="addressbook_app.AddressBook" position="3">
            <resource bundle="device.theme.carriera.resource.Theme" id="APP_ADDRESSBOOK"/>
        </application>
        <application name="calendar_app.Calendar" position="4"/>
        <application name="task_app.Tasks" position="5"/>
        <application name="browser_daemon.wap" position="6">
            <resource bundle="device.theme.carriera.resource.Theme" id="APP_WAP"/>
        </application>
        <application name="browser_daemon.mds.private" position="7">
            <resource bundle="device.theme.carriera.resource.Theme" id="APP_PRIVATE_MDS"/>
        </application>
        <folder name="MyStuff" position="8" move="allow" hide="allow">
            <resource bundle="device.theme.carriera.resource.Theme" id="FOLDER_MY_STUFF"/>
            <application name="standardcalculator_app.Calculator" position="1"/>
            <applicationname="device_apps_games_brickbreaker.BrickBreaker" position="2"/>
        </folder>
        <application name="memo_app.MemoPad" position="9"/>
        ⋮
</application-hierarchy>
```

FIG. 9

```xml
<!-- system colours -->
<attribute-set name="">
    <foreground color="black"/>
    <background color="white"/>                    150
    <caret>
        <draw style="redraw"/>
        <foreground color="white"/>
        <background color="red"/>
    </caret>
</attribute-set>
<attribute-set name="browser-scrollbar">
    <foreground color="red"/>
    <background color="white"/>
</attribute-set>
<attribute-set name="day-indicator-selected">
    <foreground color="green"/>
</attribute-set>
<attribute-set name="title">
    <foreground color="white"/>
    <background color="red"/>
    <caret>
        <draw style="redraw"/>
        <foreground color="red"/>
        <background color="white"/>
    </caret>
    <font style="bold"/>
</attribute-set>

⋮

<attribute-set name="banner">
    <layout src="banner.pme"/>
</attribute-set>
<attribute-set name="separator#banner">
    <foreground color="white"/>
</attribute-set>

⋮

<attribute-set name="client#calculator">
    <foreground color="black"/>
    <background>
        <image src="background_calculator.png"/>
    </background>
</attribute-set>
</theme>
```

FIG. 12

METHOD AND DATA STRUCTURE FOR USER INTERFACE CUSTOMIZATION

RELATED APPLICATION

This application claims priority to U.S. Provisional Patent Application No. 60/499,437 filed Sep. 2, 2003, which is incorporated herein by reference.

FIELD OF THE INVENTION

The present invention relates to customizable user interfaces for mobile electronic devices.

BACKGROUND OF THE INVENTION

Compact electronic devices such as personal digital assistants (PDAs), cell phones, pagers, organizers and wireless mobile computing devices are often resource limited in that they have limited storage and processing power, and in the case of wireless enabled devices, limited communication bandwidth. The limited resources of such devices place constraints on the user interfaces used in such devices. For example, in compact electronic devices, it is generally not possible to dynamically change the theme or layout of the user interface once the device has been shipped. Customization of the user interface device for different users or, in the case of wireless enabled devices, for different wireless network operators or carriers, is a time consuming task that involves changing user interface source code loaded on the device. In addition to delivery and installation issues, source code based customization solutions can be cumbersome as the graphic designers that develop user interfaces frequently have limited programming skills. Customization of user interfaces is also hindered by the presence of a concurrent mix of newer and older devices that have varying capabilities but that all must be supported. For example, a given carrier may concurrently support monochrome and color devices.

Thus, there is a need for a method, system and data structure that enables changes and customizations to user interfaces for resource-limited devices to be economically, efficiently and easily implemented.

SUMMARY OF THE INVENTION

At least one example of the invention pertains to a method for changing visual attributes presented by a graphical user interface of a device such as a mobile electronic device by loading onto the device a file containing information for changing selected visual attributes of the interface. According to at least one example of the invention, there is provided a method of customizing a graphical user interface of a mobile electronic device, the graphical user interface having a plurality of displayed elements each having visual attributes, including storing an information file on the mobile electronic device, the information file including information defining at least one substitute visual attribute for at least one of the displayed elements of the graphical user interface; and changing at least one pre-existing visual attribute of the at least one displayed element to the at least one substitute visual attribute. In some example embodiments, the mobile electronic device is a wireless device and the information file is received by the mobile electronic device over a wireless network. In some embodiments, the substitute visual attributes includes foreground and background colors presented by the graphical user interface, and the look of at least some graphical images presented by the graphical user interface.

At least one example of the invention pertains to a method or compiler for generating or compiling a file that contains information used by a device to change the user interface presented by the device. According to an example of the invention, there is provided a method of generating a user interface customization file for use by a device to customize the user interface of the device, including: i) receiving an instruction file including: a) a list of custom graphic image files for presentation by the user interface; and b) a style sheet defining custom visual attributes of elements of the user interface; ii) retrieving the custom graphic image files in the list; and iii) combining information from the instruction file and the custom graphic image files to produce a downloadable user interface customization file usable by the device. In some embodiments, such method includes error checking the instruction file prior to the combining. In some embodiments, such method includes compressing the information from at least one of the instruction files and the custom graphic image files prior to the combining.

BRIEF DESCRIPTION OF THE DRAWINGS

Embodiments of the present invention will now be described, by way of example only, with reference to the attached Figures, wherein:

FIG. 3 is a block diagram of an example of a user interface data provider of the communication system of FIG. 1;

FIG. 4 is a block diagram representation of an example XML file used in embodiments of the present invention;

FIG. 5 is an example of a header of the example XML file;

FIG. 6 shows excerpts of a file list from the example XML file;

FIG. 9 shows excerpts of an application hierarchy list from the example XML file;

FIG. 12 shows excerpts of a style sheet from the example XML file;

Like reference numerals are used throughout the Figures to denote similar elements and features.

DETAILED DESCRIPTION

Figure 1:
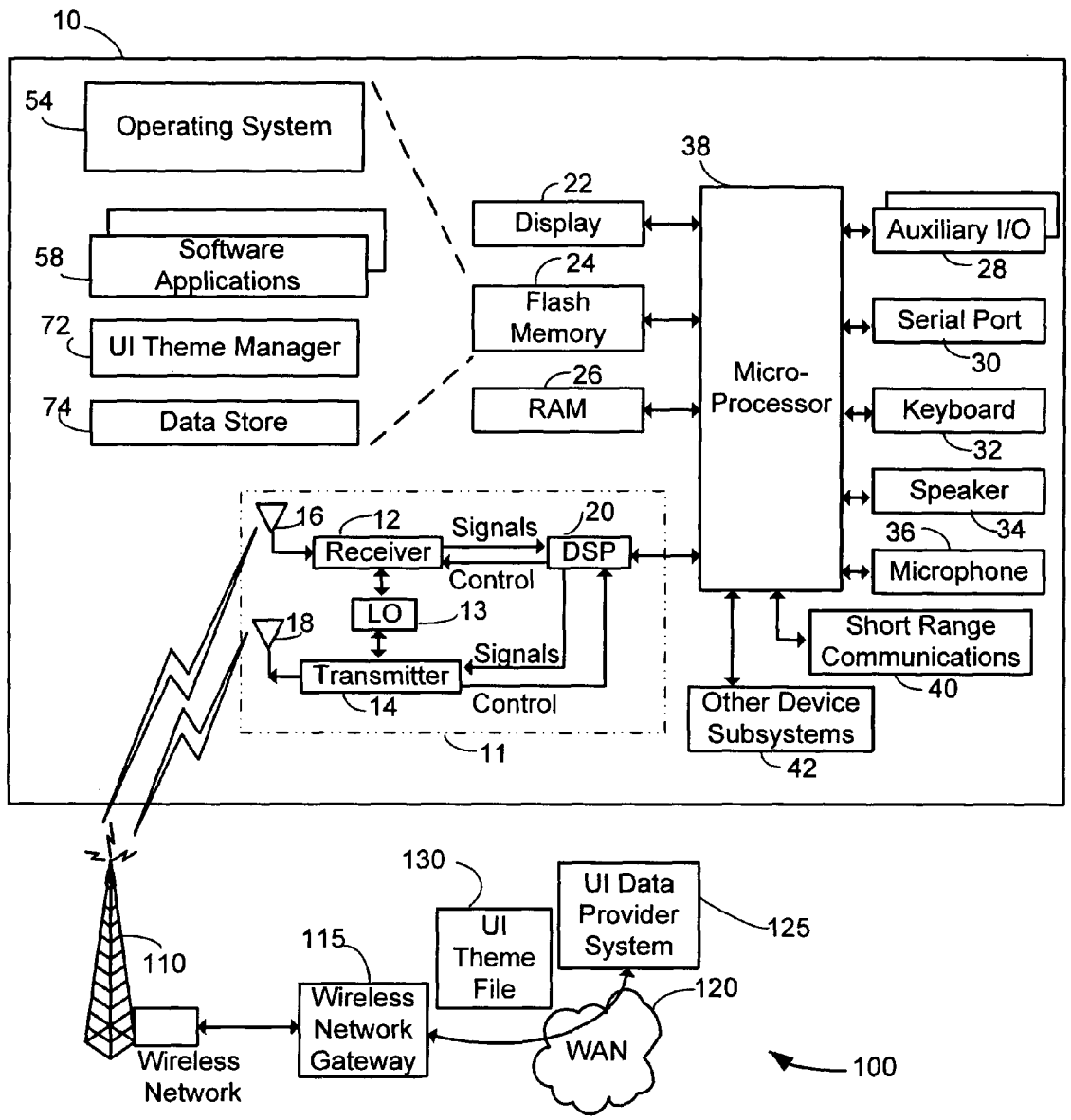
FIG. 1 is a block diagram of a mobile electronic device and a communications system to which embodiments of the present invention may be applied.

Referring to FIG. 1, there is a block diagram of a communication system 100 and mobile electronic device 10 to which example embodiments of the present invention may be applied. The communication system 100 includes mobile electronic devices 10 (only one of which is shown in FIG. 1), a wireless network 110 for communicating with the mobile electronic devices 10, a wireless network gateway 115 for interfacing the wireless network 110 with a Wide Area Network (WAN) 120, the WAN 120 connecting the wireless network gateway 115 with a User Interface (UI) data provider system 125.

The wireless network gateway 115 provides an interface between the wireless network 110 in which the devices 10 operate, and the WAN 120 in which the UI data provider system 125 is configured to operate. The WAN 120 can in various embodiments include the Internet, a direct connection, a local area network (LAN), a wireless communication link, and any combinations thereof. In some embodiments, data generated by the UI data provider system 125 may be provided to devices 10 through a direct link or through a data transfer means other than through WAN 120, gateway 115 and wireless network 110.

The UI data provider system 125 provides the data and/or instructions for customizing user interface presentation on the mobile electronic devices 10. More particularly, the UI data provider system provides information to mobile electronic devices 10 that can be used by such mobile electronic devices to customize or change the theme, and in some embodiments, the skin, of the user interface that is presented by the device to a user. Theme refers to attributes of the visual components or elements of the user interface that affect the look, but not the underlying meaning or semantic content, of the visual components such as colors, fonts, icon look and size, background images, and logos, among other things. Theme-able attributes are those attributes of visual elements of the user interface that can be changed or customized based on information provided to the mobile electronic device 10 from the UI data provider system 125. The user interface implemented on device 10 also includes a "skin" which is layout information specifying the placement of user interface fields (for example, button fields and text fields) and images. A skin may create or hide UI fields and can change semantic content. In some embodiments, the functionality that a skin invokes must generally already be present on device 10 and simply be invoked by a name, however, in some embodiments a skin description that supports advanced scripting may be used. In some embodiments, SVG is used to implement skins. In some embodiments, a theme may delegate to a skin the layout of specific user interface fields.

In the embodiment of FIG. 1, the mobile electronic device 10 is a hand-held two-way mobile communication device 10 having at least data and possibly also voice communication capabilities. In an example embodiment, the device has the capability to communicate with other computer systems on the Internet. In various embodiments, mobile electronic devices 10 includes data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the presently described embodiment, each of the mobile electronic devices 10 is configured to operate within the wireless network 110. It should be appreciated however that examples of the invention are in no way limited to these example types of devices and may be implemented in other devices with displays. Example embodiments may also be applied to non-wireless enabled devices.

The device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem and microprocessor 38 share an oscillator. As will be apparent to those skilled in the field of communications, the particular design of the communication subsystem 11 will be dependent upon the communication network in which the device is intended to operate.

Signals received by the antenna 16 through a wireless communication network 110 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 110 via the antenna 18.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 110 is, in an example embodiment, a wireless packet data network, (e.g. Mobitex™ or DataTAC™), which provides radio coverage to mobile electronic devices 10, although it could be any other types of wireless networks.

Figure 2:
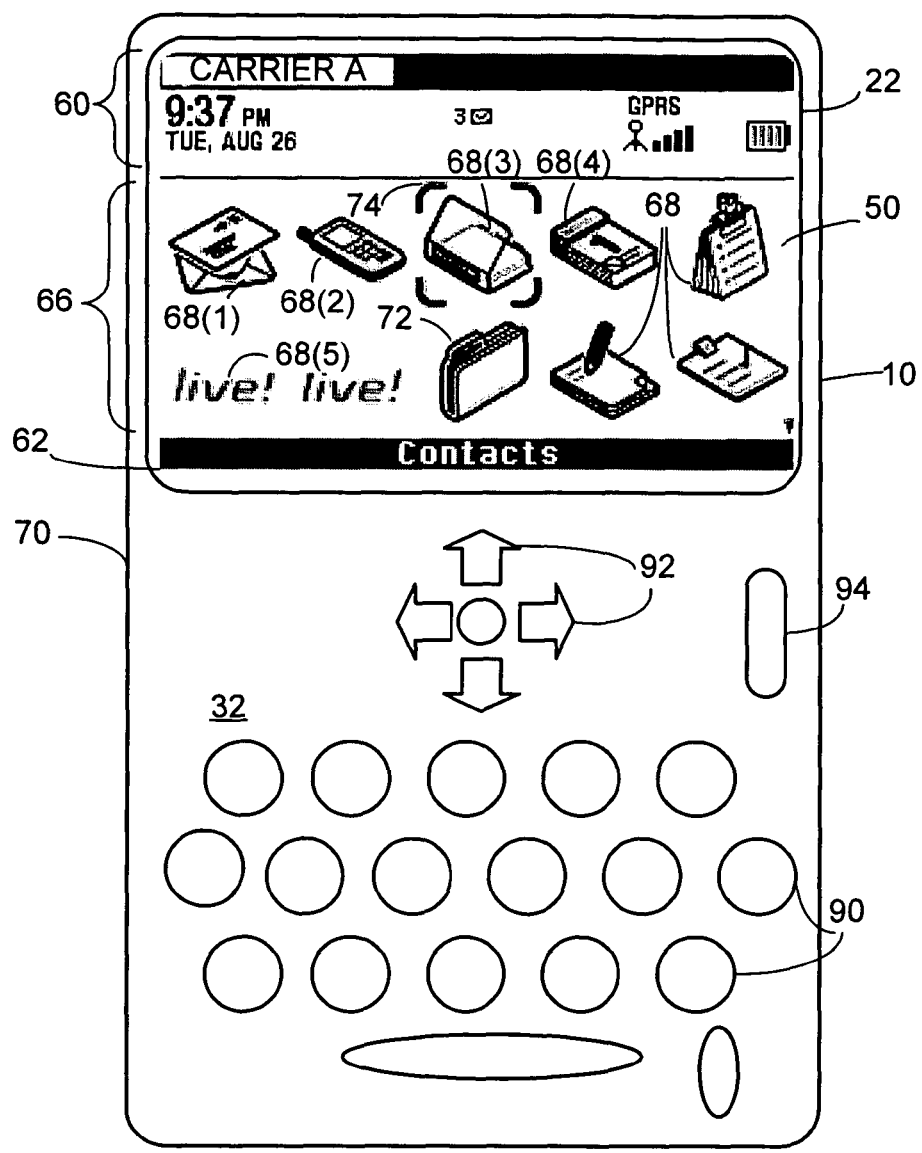
FIG. 2 is a front view of a mobile electronic device to which embodiments of the present invention may be applied.

With reference to FIG. 2, in an example embodiment, the components and subsystems of mobile electronic device 10 are housed within a hard plastic main body case 70 that is configured to be held with one or two hands while the device 10 is in use. The mobile electronic device 10 will typically be small enough to fit inside a standard purse or suit jacket pocket. The keyboard 32 includes buttons or keys 90, 92 positioned to be actuated by the thumbs or fingers of the user. In one example embodiment, alphanumeric keys 90 are arranged in a compressed QWERTY configuration, although other keyboard configurations or user input devices could be used with device 10.

As shown in FIG. 2, a graphical user interface 50 displayed on the display 22 of mobile electronic device 10 provides visual information to the user. In FIG. 2, a home or main screen user interface is shown from which various applications resident on the mobile electronic device 10 can be selected and launched. The main screen user interface 50 includes the following theme-able areas or sections: a title banner and status section 60, a selection banner 62 and a client section 66, each of which display one or more elements. In the illustrated embodiment, the title banner and status section 60 includes a coloured, for example red, band at the top of display 22, that includes a text element displaying the name of the carrier ("Carrier A") that operates the home wireless network 110 that the device 10 operates in. Status information including, for example, date and time, an unread incoming message count, wireless network type (GPRS), received signal strength, and battery strength is also displayed in section 60. As can be seen from FIG. 2, status elements can include alphanumeric values and/or graphic images.

The client section 66 displays elements that include a number of selectable application icons 68 and folder icons 72 that are presented on a background. The icons 68, 72 can be "focused" or selected with a caret 74 (or other type of pointer) that moves around the client section 66 in response to user manipulation of navigation keys 92 and/or scrolling of thumb scroll wheel 94, and/or other predetermined user input. The application icons 68 include, among other things, a mail messages icon 68(1), a phone application icon 68(2), an address book icon 68(3), a calendar icon 68(4), and a browser icon 68(5). Once an application icon 68 or a folder icon is focused with caret 74 it can be launched or opened by the user taking a predetermined action such as, for example, pressing a predetermined control key or pressing thumb scroll wheel 94. Such activity will typically result in a different graphic user interface being presented to the user on display 22. In the example shown in FIG. 2, the selection banner 62 displays the name ("Contacts") associated with the application or folder icon that is currently focused by caret 74.

According to an example embodiment of the invention, the theme, namely selected visual attributes, of the user interface 50 can be customized and changed. In one embodiment the following visual attributes of each section can be specified for the user interface 50: foreground color; background color; focus foreground color; selection foreground color; selection background color; background image; font; font-family; font-style; font-weight; font-stretch; font-size. In respect of the elements within each section, the graphic images used to display status information and the graphics images associated with applications icons and folder icons can be specified. In one embodiment, the order of displayed application and folder icons can be specified, as well as the hierarchical contents of folders.

The theme-able attributes of user interface 50 can be specified and customized based on user interface files 130 downloaded by the mobile electronic device 10 from UI data provider system 125. With reference to FIG. 3, UI data provider system 125 includes a theme compiler 132 that receives as inputs an instruction set in the form of XML (eXtensible Markup Language) file 136, and graphics files in the form of binary graphics files 134 and SVG (Scalable Vector Graphics) files 138. Based on the input files, the theme compiler 132 produces UI theme file 130, which may be stored on a UI file storage 133 at the UI provider system 125 and ultimately downloaded to one or more mobile electronic devices 10. In some embodiments, the theme compiler may produce the UI theme file 130 at one physical location or on one machine, and then it is stored in a UI file storage 133 or library for subsequent download at a separate physical location or on a separate machine. Thus, the functions of UI provider system 125 could be spread out over different physical locations or machines and performed at different times. In embodiments where the UI theme file 130 is downloaded through WAN 120 and wireless network 110, the UI provider system 125 includes an appropriate communication subsystem 140. The UI data provider system 140 includes such components as are required to communicate within the WAN 120. In embodiments where UI files can be requested from the UI data provider system, the communication subsystem 132 includes systems for processing such requests.

UI theme file 130 contains information required by the mobile electronic device 10 to implement a particular user interface theme. For example, the UI theme file 130 may include information required to customize the user interface 50 to a color, logo and icon scheme preferred by the carrier that operates the home wireless network 110 of mobile electronic device 10. In some embodiments, the UI theme file 130 may be purchasable file that includes information required to customize the user interface 50 to a color, logo and icon scheme associated with an organization such as a favoured team.

In various embodiments, one or more UI files 130 are provided to mobile electronic device 10 in response to requests for specific UI files 130 from the mobile electronic device. For example, the user of a mobile electronic device 10 may decide to download the UI theme file 130 associated with a specific theme—for example, a theme related to a favorite sports team. In other embodiments, one or more UI files 130 may be pre-loaded onto the device 10 prior to shipping of the device 10. In some embodiments, UI files may be periodically pushed over wireless network 110 to selected devices 10 as part of system updating or maintenance performed by the wireless network carrier.

In some example embodiments, graphic image files 134 are bit mapped graphic files such as .gif (Graphics Interchange Format) or .png (portable network graphics). The bit mapped graphic image files define custom binary images associated with the theme defined by the UI file—for example, any custom logos, application icons, folder icons, or status images. The SVG files 138 define in an SVG format the layout of some of the elements of the user interface theme, for example, a custom banner layout for the user interface. The SVG files 138 may not include all functions and features supported by SVG, but rather a sub-set of such functions and features. The bit-mapped graphic image files 134 and the SVG files 138 may be stored at the UI data provider system, or in other storage that is accessible to UI theme compiler 132. Other forms of graphic files may be used in other embodiments, for example .jpg. In some embodiments, the SVG files are compressed and in some embodiments they are not compressed.

The XML theme file 136 includes instructions for creating the UI theme file 130 required by the mobile electronic device 10 to implement an associated user interface theme. Thus, the XML theme file 136 is created by a graphic designer to define the unique visual attributes that specify or make up a user interface theme. With reference to FIG. 4, in one example, the XML theme file includes the following sections: header 142; file list 144; font definitions list 146; application hierarchy list 148; and style sheet 150, however such sections are not exclusive and in other embodiment the XML theme file 136 could include additional or fewer sections as required for the interface theme. FIG. 5 shows an example of a header section 142, which includes typical XML file header information. In the illustrated example, the header identifies the user interface theme that is defined by the XML theme file 136—the theme is that associated with a specific wireless network operator, "CarrierA" that operates wireless network 110.

The file list 144 of XML theme file 136 includes a list of all custom graphic image files 134 and SVG files 138 that are required to support the specified user interface theme. The UI Theme compiler 123 uses the file list 144 to identify what graphic image files 134 and SVG files 138 have to be included in the UI theme file 130 to support the associated theme. FIG. 6 shows example excerpts from the file list 144 of XML file that is associated with the user interface theme shown on user interface 50 in FIG. 2. As can be seen from FIG. 6, the file list 144 includes a list of png, .gif and .pme files, each of which defines custom graphic images required for implementing the associated user interface theme. In the illustrated embodiment .pme files are compressed SVG files. In the example file list 144, the graphics image files are classified as "system files"; "home screen files"; "application icons"; "application graphics"; and "localization resources". "System files" refer to custom graphics images that are used throughout the various user interface screens displayed on the mobile electronic device 10 when the theme associated with XML theme file 136 is the current theme on device 10. For example, the system files listed in FIG. 6 include the graphic image associated with the hourglass image used in dialog screens ("dialog_hourglass.png") and the graphic images associated with various navigation images ("navigation_down_arrow.gif", etc.). System files can, among other things, in various embodiments, include the bitmap files required for check boxes, radio buttons, navigation images such as scroll arrows, and status icons.

"Home screen files" refer to custom graphics images that are displayed on the title banner and status section 60 of the themed user interface 50. As can be seen in FIG. 6, the listed home screen files includes, among other things, a compressed SVG file defining the title banner 60 format ("banner.pme"); bit-mapped files defining custom graphics for various status images ("Ribbon_BatteryLevel-icons28×12.png", etc.); and files defining the font to be used in the date and time indicators ("datefont.png" and "timefont.png").

Figure 7:
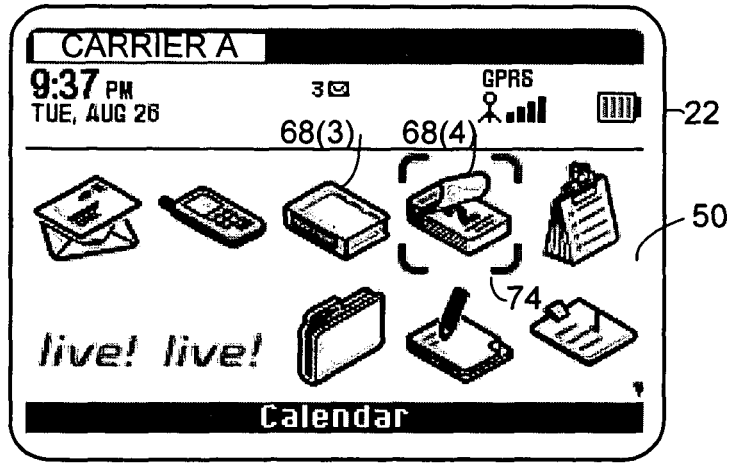
FIG. 7 is a further view of a user interface of the mobile electronic device of FIG. 2.

"Application icons" lists the graphics files that define the custom icons that are associated with the various applications that may be launched on mobile electronic device 10. Such icons may be those that are displayed in the client section 66 of the user interface 50 home screen. For example, the client section 66 shown in FIG. 2 includes, among other things, a mail messages icon 68(1), a phone application icon 68(2), an address book icon 68(3), and a calendar icon 68(4) the graphic images of which are defined respectively in the files "messaging_app.Messages.png", "phone_app.png", and "addressbook_app.AddressBook.png", "calendar_app.png" when such icons are not the subject of focus by caret 74, and files "messaging_app.Messages~focus.png", "phone_app~focus.png", "addressbok_app.AddressBook~focus.png", and "calendar_app~focus.png" when such icons are focused on by caret 74 (as the address book is in FIG. 2). To provide an example of differences between focus and non-focus icon images, FIG. 7 shows the user interface 50 in which the focus of caret 74 has moved from the address book icon 68(3) to calendar icon 68(4). In FIG. 2, the focussed address book icon 68(3) has an open cover, and the unfocussed calendar icon 68(4) has a closed cover, and the reverse is shown in FIG. 7.

"Application Graphics" lists the graphics files that are associated with custom icons and graphic images defined for specific applications.

In embodiments, strings used in at least some of the use interface elements or fields are available in several different languages (for example, English, French, German) with the strings associated with a language being bundled together (for example, German bundle). "Localization Resources" refer to such bundles, and are included so that multiple languages can be supported.

Figures 8, 10:
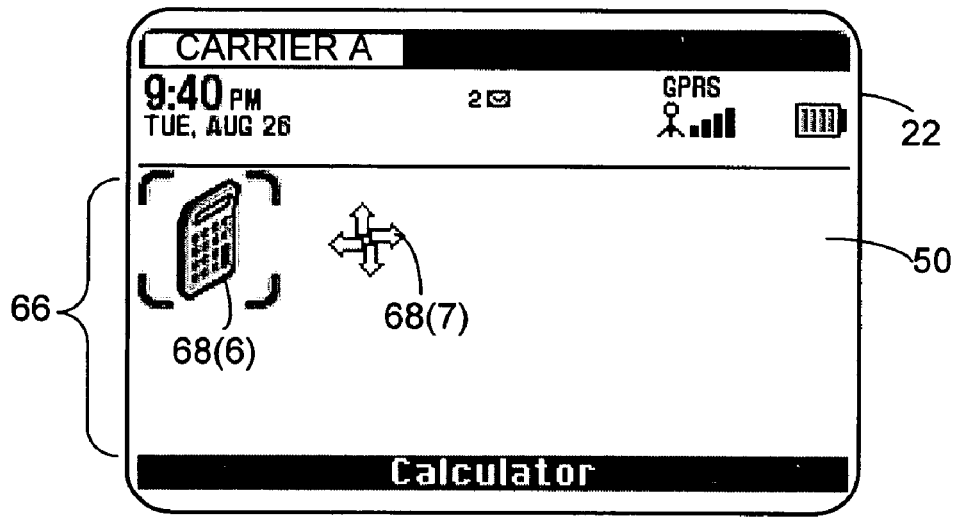
FIG. 8 shows excerpts of a font definitions list from the example XML file.
FIG. 10 is a view of a user interface of the mobile electronic device of FIG. 2 upon opening of a folder.

The font definitions list 146 of XML 136 includes definitions for custom fonts used in the user interface 50. FIG. 8 shows an example excerpt from the font definitions list 144 of XML file that defines the font used to display the date in the title banner and status section 60 of the user interface 50 in FIG. 2. Device fonts (for example Slangsoft Font File (SFF), or TrueType Font (.ttf) or others) may be specified.

The application hierarchy list 148 defines what application and folder icons 68 and 72 are displayed in client section 66 of user interface 50 home screen, and the relative position and order of such icons. FIG. 9 shows example excerpts from the application hierarchy list 148 used to define the hierarchy of icons shown in client section 66 of FIG. 2. As defined in the application hierarchy list 148 of FIG. 9, the messaging application is assigned position 1, so the messaging icon 68(1) appears in the corresponding position in client section 66 of interface 50, the phone application is assigned position 2, so the phone icon 68(2) appears in position 2, and so on. ResourceBundles are each a collection of strings (or possible other UI elements such as images or scripts) that are language specific. The code used in the ResourceBundle refers to an ID instead of an actual string, and based on a current language selection on the device 10, the appropriate string is fetched.

In the hierarchy list 148, Folder 72 is assigned position 8, and the list 148 further defines the hierarchy of the applications and sub-folders located in Folder 72. By way of example, FIG. 10 shows user interface 50 after a user has opened Folder 72. As defined in list 148, the calculator icon 68(6) associated with the calculator application is assigned the first position in client section 66 of folder user interface 50, and the "brickbreaker" game icon 68(7) associated with the brickbreaker game application is assigned position 2.

In some cases, more icons than can be displayed at a single time may be assigned to a user interface screen, in which case the user can scroll through the icons, with icons in the earlier positions being pushed off-screen as icons in the later positions are viewed, and vice versa.

Figure 11:
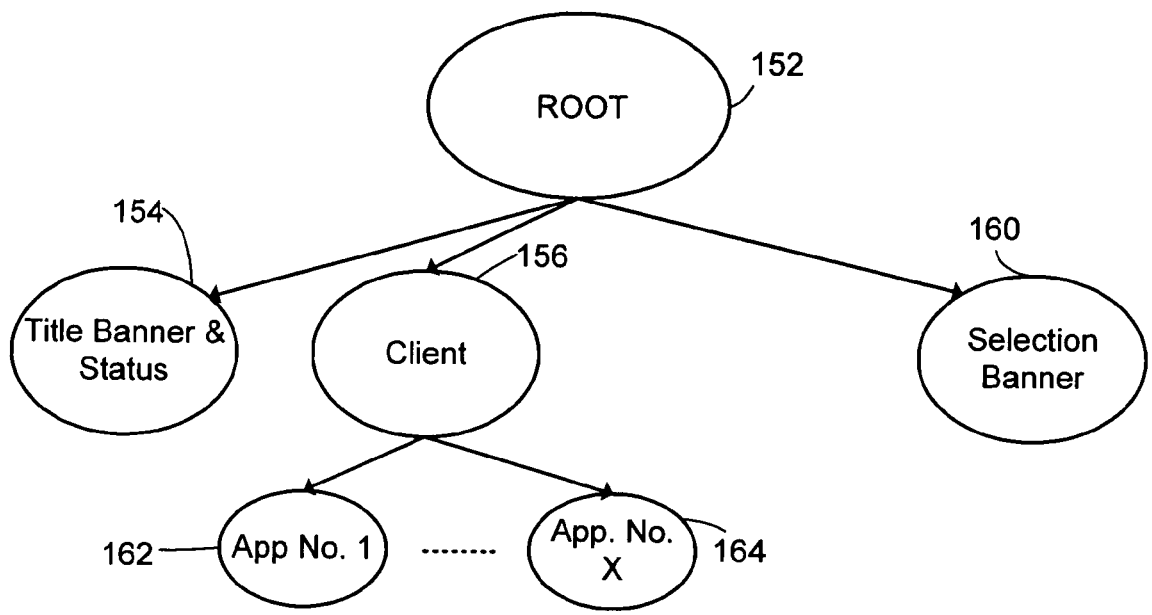
FIG. 11 is a diagrammatic view of an example structure of a style sheet from the example XML file.

The style sheet 150 of the XML theme file 136 defines the screen format, layout and foreground and background colors associated with the specified theme. In an example embodiment, the style sheet 150 has a hierarchical parent-child relationship, which is illustrated in a representative manner in FIG. 11. As indicated in FIG. 11, the style sheet defines a default or root theme attribute set 152, and child attributes sets 154, 156 and 160 that define attributes associated with, for example, the title banner and status section 60, the client section 66 and the selection banner 62, respectively. The child attribute sets may themselves be parents to child sets—for example, client attribute set 156 has child sets 162 to 164 associated with each of the applications or folders that can be launched or opened from the client section 66. The attributes in a parent set 152 are applied to the theme-able elements of the user interface unless different attributes are defined in a child set for such theme-able element. A field will inherit attributes from its container. The attribute sets shown in FIG. 11 are not exhaustive, and the style sheet may include other or additional attribute sets. FIG. 12 shows example excerpts from the style sheet 150 associated with the user interface theme of FIG. 2. It will be noted that the attribute-set name="banner" references the compressed SVG file "banner.pme". The structure of inheritance can be changed in various embodiments, and will depend dynamically on specified inheritance controls.

The use of an XML file that uses syntactic instructions to define the theme-able attributes of a user interface allows a graphic designer who is not skilled in software coding to create customization information quickly and easily through a user friendly XML authoring tool.

Figure 13:
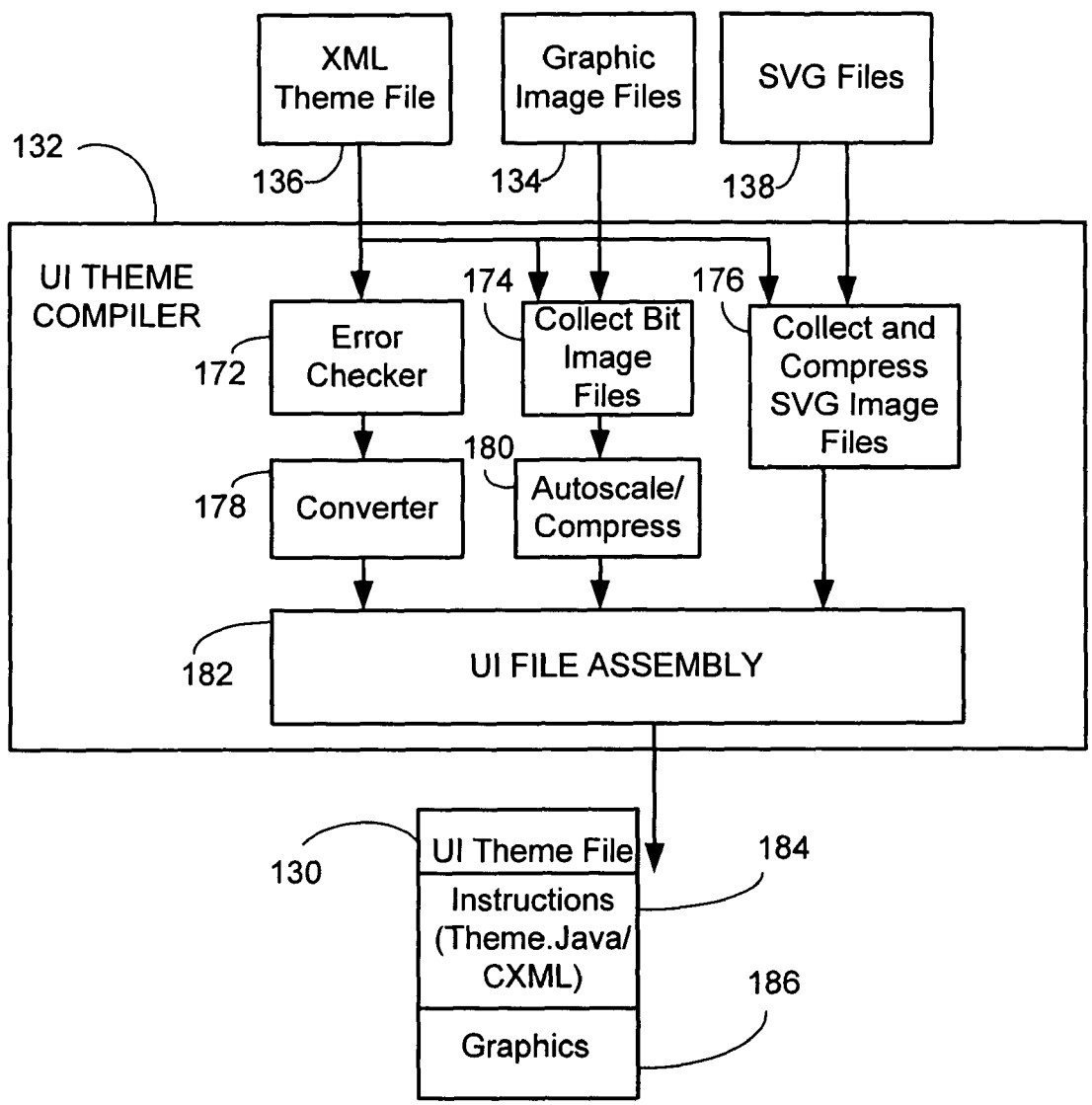
FIG. 13 is a diagrammatic view of an example of a user interface theme compiler of the user interface data provider of FIG. 3.

With reference to FIG. 13, the processing of an XML theme file 136, bit image graphic files 134, and SVG files 138 by UI theme compiler 132 will now be described in greater detail according to example embodiments of the invention. In one example embodiment, the UI theme compiler 132 includes an error checker function 172 that performs error checking on the XML theme file 136 and provides feedback if an error is found. In one example, the error checker function: a) performs a syntactic check of the character strings contained in the XML theme file 136 to determine if they match a predetermined set of acceptable character strings—in other words, a kind of "spell and grammar check"; and b) performs heuristic semantic analysis to determine if specified values fall with acceptable relationships of other specified values—for example, if a foreground and a background color are specified for an element in the style sheet 150, the checker 172 determines by consulting predetermined color relationship tables if the two colors are sufficiently different to be juxtaposed as foreground and background colors.

Once the XML theme file 136 has been approved by error checker function 172, it is subjected to a converter function 178 to put it into a format suitable for use by mobile electronic device 10. In one embodiment, the XML theme file 136 is XSLT (XML Style Language Transform) transformed to a theme JAVA file by converter function 178. In another example embodiment, the XML file is converted to a compressed CXML theme file by converter function 178. The converted file is then subjected to a UI file assembly function 182.

The UI theme compiler 132 includes a collect bit image files function 174 for retrieving from a source of binary graphic image files 134 the binary image files that are included in the file list 144 of XML theme file 136, The UI theme compiler 132 also includes a collect and compress SVG image files function 176 for retrieving from a source the SVG files that are included in the file list 144 of XML theme file 136, and, in at least some embodiments, compressing such SVG files. In at least one example embodiment, the retrieved graphic image files 134 are provided to an auto-scaling function 180. Auto-scaling function is configured to create scaled versions of graphics images as required by XML theme file 136. For example, the source of graphic image files may include a "large" binary bit map for a specific icon for which "normal" and "small" sizes are also required. In such cases, the auto-scale function 180 is configured to recognize the need for "normal" and "small" versions of the icon, and to automatically generate the binary files for such graphics by applying the appropriate scaling to the "large" version. Such a function eliminates the need for a graphic designer to manually create multiple scaled versions of the same graphic image—the designer need only create a single image, and the autoscale function will automatically create any other sizes required by the theme. In some embodiments compression or conversion of the bit image file into smaller formats may be performed by UI theme compiler 132—such conversion may include, among other things, quantizing and palletizing graphic image files. In some embodiments, vector images are also specified as sources for inclusion in the output UI theme file.

The UI file assembly function 182 receives the converted theme file from converter 178, as well as the compressed graphic binary image files and compressed SVG image files, and packages such information into UI theme file 130 for loading onto mobile electronic device 10. The UI theme file 130 includes theme instructions 184 for the mobile electronic device, either in the form of a Theme.java file or a CXML file, and graphics files 186, representing graphic image files 134 and SVG files 138, in a form suitable for rendering by mobile electronic device 10. It will be appreciated that in various embodiments, the UI theme file 130 includes the information required to, among other things specify custom attributes such as color, background color, foreground color, background images and font used in various user interface elements. The UI theme file 130, in various embodiments, includes the information for generating various custom applications and folder icons, including varying sizes of the custom icons (for example, small, regular and large versions), and for generating normal, focused and selected states of such icons. In various embodiments, UI theme file 130 includes the information for generating other custom images such as check boxes, radio buttons, navigation images such as scroll arrows, and status icons.

Processing of UI theme file 130 by mobile electronic device 10 will now be discussed in greater detail. Referring again to FIG. 1, the mobile electronic device 10 includes UI theme manager software for implementing a UI theme manager 72. In one embodiment the UI theme manager is implemented on a JAVA runtime layer of the device 10. Various functions of the UI theme manager could, in various embodiments, be performed by operating system 54 and/or other software applications 58. The mobile electronic device 10 also includes a data storage 74 for storing graphics and other files.

Figure 14:
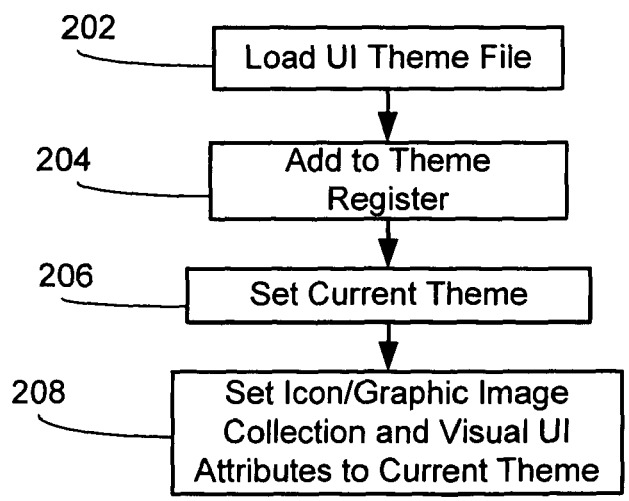
FIG. 14 is a block diagram showing processing of a user interface theme file by a mobile electronic device.

In one example embodiment, the mobile electronic device 10 is provided with an initially installed set of default user interface attributes. The UI theme manager 72 is configured to use such attributes unless instructed otherwise. The UI theme manager maintains a list or register of selectable themes for which the corresponding UI theme files 130 have been loaded on the device. FIG. 14 shows an example process by which a UI theme file 130 is processed at mobile electronic device 10. As indicated in step 202, a specified UI theme file 130 is first loaded onto the device 10. Such loading can occur in a variety of different ways. For example, in one embodiment a carrier or manufacturer preloads one or more UI theme files 130 onto the device 10 prior to delivery to an end user. Alternatively, the mobile electronic device 10 may download the UI theme file 130 over wireless network 110. The UI theme file 130 may be loaded on the mobile electronic device 10 through its short range communications system 40, or its serial port 30. When downloaded over wireless network 110 or otherwise, the UI theme file 130 may originate at a UI data provider system 125 located on the Internet.

The mobile electronic device 10 may be configured to automatically download, on device activation or at predetermined intervals or upon prompting, over wireless network 110 and WAN 120 from a specified Web address one or more specified UI theme files 130. Alternatively, the downloading of a UI theme file 130 could be user initiated, with the user downloading, perhaps upon payment of a monetary amount, a UI theme file 130 associated with a theme desired by the user.

The UI theme manager 72 is made aware of the presence of a new UI theme file 130 once it is downloaded, and as indicated in Step 204, the new theme is added to a list or register of selectable UI themes. Such register may include one or more selectable themes. In an embodiment where the UI theme file 130 includes instructions in the form of a theme-.java file, the file self-executes upon downloading and advises the theme manager 72 of its presence. In an embodiment where the instructions are in the form of a CXML file, a file download manager may be configured to detect the presence of the theme file and advise the theme manager. The graphics files and instructions associated with the UI theme file 130 are stored in data store 74.

As indicated in step 206, the UI theme manager is configured to set a current user interface theme. In one embodiment, the user can specify a current theme from among the themes included in the theme register. In other embodiments, the current theme may be automatically or default selected.

As indicated in step 208, once a theme has been selected as a current theme, the UI theme manager 72 maintains in memory an icon/graphic image collection specified by the instructions associated with the current theme, as well as the current visual user interface attributes associated with the theme. Elements that are displayed on the screen have the visual attributes specified by the current theme applied to them. Icons and other graphic images that are displayed are selected from the theme icon/graphic image collection.

Figure 15:
FIG. 15 shows an example of user interface with a different theme than that shown in FIG. 2.

Thus, several theme-able attributes of a user interface can be dynamically and quickly changed. By way of example, FIG. 15 shows user interface 50A as specified by a different UI theme file 130 than the user interface shown in FIG. 2. In the user interface of FIG. 15, different, smaller icons are displayed in a different order in the client section, and the color and layout of the banners and status sections and the graphic images has changed. However, none of the underlying functions or applications that are represented by the elements of the user interface has changed.

The above-described embodiments of the present invention are intended to be examples only. Alterations, modifications and variations may be effected to the particular embodiments by those skilled in the art without departing from the scope of the invention, which is defined by the claims appended hereto.

We claim:

1. An automated method of providing a user interface customization file for use by a mobile device to customize the user interface of the mobile device, including:

receiving an instruction file including: a) a list identifying custom graphic image files each defining an image for presentation by the user interface; and b) an instruction set defining custom visual attributes of elements of the user interface, the visual attributes including at least two color attributes, wherein the visual attributes specified for at least some of the elements of the user interface include a foreground and background color;

using the list for retrieving the custom graphic image files identified in the list;

automatically scaling at least some of the custom graphic images specified in the list of custom graphic image files to produce scaled graphic images, as required by the instruction file;

performing relational error checking on at least some of the visual attributes defined in the instruction set to determine if the colors of at least two of the color attributes are sufficiently different by consulting predetermined color relationship tables, wherein the relational error checking includes comparing the foreground and background colors specified for at least some of the elements to determine if the compared foreground and background colors are sufficiently different according to predetermined criteria;

generating in dependence on the instruction set in the received instruction file and the scaled graphic images a downloadable user interface customization file usable by the mobile device that includes (i) instructions for the mobile device defining, the custom visual attributes of the elements of the user interface in accordance with the instruction set and (ii) graphic image files for the mobile device defining the images; and sending the user interface customization file over a network to the mobile device, wherein the user interface customization file is a self-executing file.

2. The method of claim 1 including syntactic error checking of the instruction file prior to the generating.

3. The method of claim 1 wherein the custom graphic image files include files defining icons for presentation in the user interface, and the instruction set includes a hierarchy list defining a presentation layout for at least some of the icons.

4. The method of claim 1 wherein at least some of the elements of the user interface include text, and the instruction set includes a font definitions list defining custom visual attributes for the text, wherein the defined custom visual attributes for the text include at least one of font; font-family; font-style; font-weight; font-stretch; and font-size.

5. The method of claim 1 wherein the instruction set includes a style sheet, the color attributes including at least one of: foreground color; background color; focus foreground color; selection foreground color; and selection background color, and the color attributes are defined in the style sheet.

6. The method of claim 1 wherein the instruction file is in an XML compatible format and the graphic image files include both bit image files and SVG compatible files.

7. The method of claim 1 including automatically
compressing at least some of the custom graphic images specified in the custom graphic image files and including the compressed images in the downloadable user interface customization file.

8. The method of claim 1 wherein the instructions included in the user interface customization file define visual attributes that are associated with a theme.

9. The method of claim 1 wherein the mobile device has a plurality of displayed elements each having pre-existing visual attributes, the method further including:
changing at least one pre-existing visual attribute of at least one of the displayed elements on the mobile device to a substitute visual attribute specified in the user interface customization file.

10. A user interface theme compiler device for generating, in dependence on an instruction file, a user interface customization file for use by a mobile device to customize a user interface thereof, the instruction file including: a) a list identifying custom graphic image files each defining an image for presentation in the user interface, and b) an instruction set defining custom visual attributes of elements of the user interface, the visual attributes including at least two color attributes, the theme compiler including, wherein the visual attributes specified for at least some of the elements of the user interface include a foreground and background color:
collection means for using the list to retrieve from at least one source the custom graphic image files that are identified in the of custom graphic image files of the instruction file;
an auto-scaling function for automatically scaling at least some of the custom graphic images specified in the list of custom graphic image files to produce scaled graphic images, as required by the instruction file;
an error checking function for performing relational error checking on at least some of the visual attributes defined in the instruction set to determine if the colors of at least two of the color attributes are sufficiently different by consulting predetermined color relationship tables, wherein the relational error checking includes comparing the foreground and background colors specified for at least some of the elements to determine if the compared foreground and background colors are sufficiently different according to predetermined criteria; and
file assembly means for producing, in dependence on the instruction set in the instruction file and the scaled graphic images, a downloadable user interface customization file that includes image files defining the images and instructions defining, in accordance with the instruction set, the custom visual attributes the elements of the user interface; and
a communication subsystem for sending the user interface customization file over a network to the mobile device, wherein the user interface customization file is a self-executing file.

11. The user interface theme compiler device of claim 10 wherein the visual attributes specified for at least some of the elements of the user interface include a foreground and background color and the relational error checking includes comparing the foreground and background colors specified for at least some of the elements to determine if the compared foreground and background colors are sufficiently different according to predetermined criteria.

12. The user interface theme compiler device of claim 10 including compression means for compressing at least some of the custom graphic image files, wherein the file assembly means includes the compressed graphic image files in the image files of the downloadable user interface customization file.

13. The user interface theme compiler device of claim 10 wherein the elements of the user interface each convey a meaning that is unaffected by the visual attributes defined in the instruction set.

14. A computer program product comprising a machine readable storage medium having encoded thereon computer-executable instructions for providing a user interface customization file for use by a mobile device to customize the user interface of the mobile device, the computer-executable instructions comprising:
instructions for receiving an instruction file, the instruction file including: a) a list identifying custom graphic image files each defining an image for presentation by the user interface; and b) a style sheet an instruction set defining custom visual attributes of elements of the user interface, the visual attributes including at least two color attributes, wherein the visual attributes specified for at least some of the elements of the user interface include a foreground and background color;
instructions for using the list to retrieve the custom graphic image files identified in the list;
instructions for automatically scaling at least some of the custom graphic images specified in the list of custom graphic image files to produce scaled graphic images, as required by the instruction file;
instructions for performing relational error checking on at least some of the visual attributes defined in the instruction set to determine if the colors of at least two of the color attributes are sufficiently different by consulting predetermined color relationship tables, wherein the relational error checking includes comparing the foreground and background colors specified for at least some of the elements to determine if the compared foreground and background colors are sufficiently different according to predetermined criteria;
instructions for generating in dependence on the instruction set in the instruction file and the scaled graphic images a downloadable user interface customization file usable by the mobile device that includes (i) instructions for the mobile device defining the custom visual attributes of the elements of the user interface in accordance with the instruction set and (ii) graphic image files for the mobile device defining the images; and
instructions for sending the user interface customization file over a network to the mobile device,
wherein the user interface customization file is a self-executing file.

15. An automated method of providing a user interface customization file for use by a mobile device to customize the user interface of the mobile device, including:
receiving an XML theme file defining the custom visual attributes for the user interface, wherein the XML theme file includes (a) a file list identifying custom graphic image files each defining an image for presentation by the user interface, (b) a font definition list defining a font for the user interface, (c) an application hierarchy list defining the layout of application icons on the user interface, and (d) a style sheet defining at least the screen format, foreground color, and background color for the user interface, the visual attributes including at least two color attributes, wherein the visual attributes specified for at least some of the elements of the user interface include a foreground and background color;

error checking the XML theme file, including a syntactic check and a heuristic semantic analysis;

using the list for retrieving the custom graphic image files identified in the file list;

converting the XML file into another format to produce a converted theme file;

scaling and compressing the custom graphic image files, as required by the instruction file, to generate compressed image files;

assembling the compressed image files and converted theme file into the user interface customization file; and transmitting the user interface customization file to the mobile device over a wireless network, wherein error checking the XML theme file includes performing relational error checking on at least some of the visual attributes defined in the XML theme file to determine if the colors of at least two of the color attributes are sufficiently different by consulting predetermined color relationship tables, wherein the relational error checking includes comparing the foreground and background colors specified for at least some of the elements to determine if the compared foreground and background colors are sufficiently different according to predetermined criteria, and wherein the user interface customization file is a self-executing file.

* * * * *